3,165,434
METHOD FOR ADHESIVELY BONDING PLASTICS TO ONE ANOTHER AND TO METALS
Henno Keskkula and John A. Schmitt, Midland, Mich., assignors to The Dow Chemical Company, Midland, Mich., a corporation of Delaware
No Drawing. Filed May 13, 1960, Ser. No. 28,855
2 Claims. (Cl. 156—327)

This invention relates to adhesives and pertains especially to a method for adhesively bonding plastics such as nylon and polyethylene terephthalate to one another and to metals.

A variety of adhesives are known for bonding plastics to various surfaces such as wood, metal, concrete, or to other plastics. However, the bonding of nylon to nylon, or nylon to polyethylene terephthalate, or nylon or polyethylene terephthalate to metals presents difficulties which have not heretofore been satisfactorily solved.

It has now been discovered that copolymers of from about 14 to 30 percent by weight of itaconic acid and correspondingly from about 86 to about 70 percent by weight of a mixture of monomers consisting of from about 0.5 to 50 percent by weight of styrene and from 50 to 99.5 percent of butadiene, are particularly effective materials for adhesively bonding nylon or polyethylene terephthalate to one another or to metals, particularly when such polymers containing the ingredients in the aforementioned proportions are employed in the form of synthetic latexes prepared by polymerizing the monomers in an aqueous emulsion.

The synthetic latexes of the copolymers can be prepared in known ways such as by polymerizing a mixture of the three ingredients in an aqueous medium containing an emulsifying agent, e.g., polyoxyalkylene alcohol ethers of alkyl phenols, sodium lauryl sulfate, or potassium salt of disproportionated rosin acids, or the latex can be prepared by polymerizing a mixture of the monomer in the absence of a surfactant or emulsifying agent employing a salt of a peroxy disulfate such as sodium persulfate, potassium persulfate or ammonium persulfates as both polymerization catalyst and emulsifying agent to produce stable latexes of the copolymers.

In an alternate procedure, a mixture of the styrene and butadiene can be polymerized in admixture with an aqueous medium comprising water until the polymerization is substantially complete, and thereafter adding the itaconic acid to the latex of the already formed copolymer and continuing the polymerization with or without the addition of added amounts of polymerization catalyst and/or emulsifying agent to produce a synthetic latex containing the three ingredients in chemically combined or interpolymerized form in the desired proportions.

The polymerization of the monomers in the aqueous medium to produce a synthetic latex can be carried out at temperatures between about 50 and 110° C., preferably from 70 to 95° C., and under a pressure at least as high as the vapor pressure of the mixture of the materials under the temperature conditions employed, although greater pressures can be used. The latexes are preferably prepared by polymerizing the monomers in an aqueous medium employing a peroxy dipersulfate salt such as sodium persulfate, potassium persulfate or ammonium persulfate both as polymerization catalyst and emulsifying agent and in the absence or substantial absence of any other emulsifying agent, but other known emulsifying agents and catalysts can be used.

In bonding the resinous polymers nylon or polyethylene terephthalate to themselves or one another or to metals, at least one, preferably both, of the surfaces to be adhesively bonded are coated with a layer of the latex of the ternary polymer comprising the itaconic acid, styrene and butadiene in chemically combined form, which is dried or allowed to dry to a tacky condition after which the coated surfaces or the surfaces to be joined are pressed together, then are cured by heating to a temperature of at least 140° C. Such heating and curing can be effected at temperatures between about 140° and 180° C. for periods of time which may range from about 15 minutes up to 3.5 hours, but should not be continued for temperatures and times which deleteriously effect the properties of the polymers.

It is important in the bonding of the polymers to one another and to metals that the coated surfaces be pressed together, either when the coating is in a tacky condition, or maintained in contact with one another when the coating is in a non-tacky condition, during the heating-up and curing of the coating in order to obtain bonds possessing good adhesive strength. The curing of the coating at elevated temperatures and under at least sufficient pressure to maintain the surfaces to be adhesively joined to one another to remain in contact during the heating up results in the formation of bonds in which the copolymer of the coating appears to chemically combine with the polymer or metal.

The thickness of the coating can be varied as desired by applying one or a plurality of layers of the latex to the surfaces to be joined. Thin layers are obtained, in general, by the application of a single layer of the synthetic latex to the surface or surfaces of the materials to be bonded to one another. Thicker layers of the coating are obtained by applying a plurality of layers of the latex, one on top of the other, with drying of the layers between applications. The layers or coating of the latex can be applied in usual ways such as by brushing, spraying or dipping.

In practice, the latex of the ternary polymer is preferably employed without additives or thickening agents, i.e., in the condition in which it is prepared by polymerizing a mixture of the monomers in an aqueous emulsion employing a peroxy disulfate salt as both polymerization catalyst and emulsifying agent until the polymerization is complete or substantially complete. Such latexes may contain from about 20 to 50 percent by weight of the copolymer and have a viscosity of from 5 to 75 centipoises as measured at 25° C. They dry readily in air at room temperature or thereabout to form tacky to non-tacky coatings which upon heating at elevated temperatures between about 140° and 180° C. become cured to form strong adhesive bonds between nylon and polyethylene terephthalate and between such polymers and metals such as aluminum, copper, brass, tin, zinc, magnesium or stainless steel.

The following examples illustrate ways in which the principle of the invention has been applied, but are not to be construed as limiting its scope.

EXAMPLE 1

In each of a series of experiments, a synthetic latex was prepared by polymerizing a mixture of itaconic acid, butadiene, and styrene, in proportions as stated in the following table, while dispersed in water in proportions corresponding to 158 parts by weight of the water per 100 parts by weight of the sum of the monomers, and in admixture with 0.1 part by weight of ethylenediamine tetraacetic acid and 0.3 part by weight of ammonium persulfate as catalyst and emulsifying agent, each based on 100 parts by weight of the sum of the monomers initially used. The ingredients were placed in a closed vessel and were agitated and heated at a temperature of 70° C. for a period of time as stated in the following table to polymerize the monomers. Thereafter, the pressure was released and the product was cooled and removed from the vessel. In each of the experiments the product was obtained as a stable emulsion or synthetic latex. Table I identifies the copolymer latexes by giving the proportions of the monomeric ingredients employed in making the same. The table also gives the time and temperature conditions employed in carrying out the polymerizations.

*Table I*

| Run No. | Starting Monomers | | | Polymerization Conditions | |
|---|---|---|---|---|---|
| | Itaconic Acid, Percent | Styrene, Percent | Butadiene, Percent | Temp., °C. | Time, Hrs. |
| 1 | 10 | 45 | 45 | 70 | 17.5 |
| 2 | 15.8 | 42.1 | 42.1 | 70 | 27 |
| 3 | 30 | 40 | 30 | 70 | 19.5 |

EXAMPLE 2

In each of a series of experiments, molded test pieces of nylon (Zytel 101) having the dimensions 0.1 x 0.75 inch cross-section by 3.5 inches long were prepared by injection molding the granular nylon on a Watson-Stillman molding machine at 13,000 p.s.i. gauge pressure and a temperature of 590° F. using a 70 second cycle. These test pieces were used to test the copolymers prepared in Example 1 as adhesives for bonding nylon to itself. The procedure for testing the copolymers as adhesives was to dip or coat one end of each of two of the 0.1 x 0.75 inch by 3.5 inches long test pieces with the latex of the copolymer so that the coating covered a distance of at least 0.75 inch of the length of the test pieces. The coating was allowed to dry tack free in air at room temperature. The two coated ends of the test pieces were placed end to end. The joint was covered on each side with a splice of molded nylon having the dimensions 0.1 x 0.75 inch cross-section by 0.75 inch long. A weight of 6 pounds was placed over the splice and the assembly was placed in an oven and heated at a temperature and for a period of time as stated in the following table. Thereafter, the test pieces were removed from the oven and allowed to cool to room temperature. The free ends of the test pieces were clamped in a testing machine of the constant-rate-of-cross head movement type and placed under tension until the bond or the test piece of nylon broke. Table II identifies the experiments and gives the proportion of itaconic acid employed in preparing the copolymer in latex form which was used as the adhesive for bonding the nylon test pieces to one another. The table also gives the pull in pounds at which the bond or the nylon test piece broke.

*Table II*

| Test No. | Itaconic Acid, Percent | Curing Conditions | | Bond Strength | |
|---|---|---|---|---|---|
| | | Temp., °C. | Time, Hrs. | Stress, Lbs. | Remarks |
| 1 | 10 | 140 | 0.5 | 123 | Bond broke. |
| 2 | 15.8 | 140 | 0.5 | 560 | Nylon broke. |
| 3 | 30 | 140 | 0.5 | 538 | Do. |
| 4 | 10 | 150 | 0.5 | 282 | Bond broke. |
| 5 | 15.8 | 150 | 0.5 | 614 | Nylon broke. |
| 6 | 30 | 150 | 0.5 | 694 | Do. |
| 7 | 10 | 160 | 0.5 | 368 | Bond broke. |
| 8 | 15.8 | 160 | 0.5 | 582 | Nylon broke. |
| 9 | 30 | 160 | 0.5 | 658 | Do. |
| 10 | 10 | 140 | 3.5 | 114 | Bond broke. |
| 11 | 15.8 | 140 | 3.5 | 381 | Nylon broke. |
| 12 | 30 | 140 | 3.5 | 388 | Do. |

EXAMPLE 3

A polyethylene terephathalate film 4 mils thick was brush coated with two layers of an aqueous emulsion of a copolymer of 40 percent by weight of butadiene, 40 percent of styrene and 20 percent of itaconic acid, prepared by procedure similar to that described in Example 1, along the edge of one surface to form a layer approximately 0.75 inch wide. The coating was dried in air at room temperature until tacky. Test pieces 0.5 inch wide were cut from the coated polyethylene terephthalate film. The coated ends of two test pieces were overlapped 0.5 inch and the tacky coatings pressed together by finger pressure. Thereafter, the test pieces were heated in an air oven at 140° C. for a period of 0.5 hour, then were removed and allowed to stand at room temperature for 24 hours. The free ends of the test piece were placed in a testing machine and placed under increasing tension. The film broke under a stress of 31.2 pounds without rupture of the adhesive bond.

EXAMPLE 4

Test pieces of sheet aluminum metal 20 mils thick by one inch wide by five inches long were brush coated on one side with two layers of a synthetic latex of a copolymer of 40 percent by weight of butadiene, 40 percent of styrene and 20 percent of itaconic acid prepared by procedure similar to that described in Example 1, and were allowed to dry in air at room temperature. The ends of two test pieces were overlapped a distance of one inch with the adhesive coated surfaces in contact with one another and were pressed together and heated at a temperature of 143° C. under a pressure of 1000 pounds per square inch gauge pressure for a period of 0.5 hour. Thereafter, the test pieces were removed from the press and were allowed to cool to room temperature. These test pieces were employed to determine the strength properties of the copolymer adhesive in shear employing a procedure similar to that described in ASTM 1002–49T. The aluminum test piece broke at 283 pounds per square inch of shear area without rupture of the copolymer adhesive bond.

We claim:

1. A method of adhesively bonding polyethylene terephthalate resins to one another which comprises coating a surface of said resinous polyethylene terephthalate with a layer of latex of a copolymer of from 14 to 30 percent by weight of itaconic acid and from 86 to 70 percent by weight of a mixture of monomers consisting of from about 0.5 to about 50 percent by weight of styrene and from about 99.5 to about 50 percent by weight of butadiene, said latex being one prepared by polymerizing a mixture of the monomers in aqueous emulsion, pressing a coated surface of said resinous polyethylene terephthalate against another surface of said resinous polyethylene terephthalate and heating the coating while in contact with said surfaces at a temperature between 140° and 180° C. for a time between 0.25 and 3.5 hours.

2. A method of adhesively bonding aluminum to aluminum which comprises coating a surface of aluminum with a layer of a latex of a copolymer of from 14 to 30 percent by weight of itaconic acid and from 86 to 70 percent by weight of a mixture of monomers consisting of from about 0.5 to 50 percent by weight of styrene and from about 99.5 to about 50 percent by weight of butadiene, said latex being one prepared by polymerizing a mixture of the monomers in aqueous emulsion, pressing a coated surface of the aluminum against another surface of aluminum and heating the coating while in contact with said surfaces at a temperature between 140° and 180° C. for a time between 0.25 to 3.5 hours.

References Cited in the file of this patent

UNITED STATES PATENTS

| | | |
|---|---|---|
| 2,329,456 | Campbell | Sept. 4, 1943 |
| 2,461,954 | Bargmeyer | Feb. 15, 1949 |
| 2,471,818 | Hunter et al. | May 31, 1949 |
| 2,724,707 | Brown | Nov. 22, 1955 |
| 2,757,106 | Brown et al. | July 31, 1956 |
| 2,858,281 | Bauman et al. | Oct. 28, 1958 |